United States Patent
Cheng (10) Patent No.: US 11,055,659 B2
(45) Date of Patent: Jul. 6, 2021

(54) SYSTEM AND METHOD FOR AUTOMATIC PRODUCT ENROLLMENT

(71) Applicants: Beijing Jingdong Shangke Information Technology Co., Ltd., Beijing (CN); JD.com American Technologies Corporation, Mountain View, CA (US)

(72) Inventor: Hui Cheng, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 98 days.

(21) Appl. No.: 16/137,765

(22) Filed: Sep. 21, 2018

(65) Prior Publication Data

US 2020/0097892 A1 Mar. 26, 2020

(51) Int. Cl.
 *G06Q 10/08* (2012.01)
 *G06K 7/14* (2006.01)
 *G06K 7/10* (2006.01)

(52) U.S. Cl.
 CPC ....... *G06Q 10/087* (2013.01); *G06K 7/10722* (2013.01); *G06K 7/1413* (2013.01); *G06K 7/1417* (2013.01)

(58) Field of Classification Search
 CPC ........... G06T 2207/10028; G06T 7/521; G01S 17/89; G01S 17/894; G01S 17/42; G06Q 10/087; G06Q 30/0601; G06Q 10/08; G06Q 20/201; G06Q 20/208; G06Q 30/00
See application file for complete search history.

(56) References Cited

U.S. PATENT DOCUMENTS

| 8,396,755 B2 * | 3/2013 | Bonner | G06Q 30/08 705/26.3 |
| 9,333,649 B1 * | 5/2016 | Bradski | B25J 9/1697 |
| 10,055,882 B2 * | 8/2018 | Marin | G06T 11/001 |
| 10,282,902 B1 * | 5/2019 | Mishra | H04N 13/207 |

(Continued)

OTHER PUBLICATIONS

3d Scanning Technologies (last modified on May 5, 2018). Fraunhofer Institute for computer graphics research IGD, retrieved on Apr. 20, 2020 from https://www.cultlab3d.de/wp-content/uploads/2018/05/2017-02-27_CHD-Brosch%C3%BCre_EN_web.pdf ("Fraunhofer").*

(Continued)

*Primary Examiner* — Peter Ludwig
(74) *Attorney, Agent, or Firm* — China Science Patent & Trademark US LLC; Shanyun Lu (57) ABSTRACT

A system for automatic product enrollment, includes: multiple visual sensors configured to capture images of a product; multiple scales configured to measure weight distribution of the product; and a computing device in communication with the visual sensors and the scales. The computing device is configured to: determine identification of the product and construct a 3D model of the product using the captured images; retrieve warehouse information of the product based on the identification; and enroll the warehouse information, the 3D model, and the weight distribution of the product into a product database. An automatic product enrollment method using the system.

9 Claims, 8 Drawing Sheets

(56) References Cited

U.S. PATENT DOCUMENTS

| | | | | |
|---|---|---|---|---|
| 2010/0163627 | A1* | 7/2010 | Olmstead | G06K 7/10861 235/470 |
| 2013/0248593 | A1* | 9/2013 | Bonner | G06K 9/00 235/375 |
| 2015/0016712 | A1* | 1/2015 | Rhoads | G06T 17/00 382/154 |
| 2015/0310601 | A1* | 10/2015 | Rodriguez | G07G 1/0072 348/150 |
| 2016/0025888 | A1* | 1/2016 | Peschmann | G01N 23/223 378/20 |
| 2016/0063755 | A1* | 3/2016 | Cancro | G06Q 20/208 345/424 |
| 2017/0054965 | A1* | 2/2017 | Raab | H04N 13/239 |
| 2017/0227674 | A1* | 8/2017 | Sorensen | G01B 11/2527 |
| 2018/0174358 | A1* | 6/2018 | Gao | G06K 7/10762 |
| 2018/0211373 | A1* | 7/2018 | Stoppa | G06K 9/6273 |
| 2018/0330134 | A1* | 11/2018 | Wagner | B07C 5/3412 |
| 2020/0041264 | A1* | 2/2020 | Bilodeau | G01N 21/85 |

OTHER PUBLICATIONS

Visual Computing Report—Video Podcast Mar. 2015(english).*

* cited by examiner

SYSTEM AND METHOD FOR AUTOMATIC PRODUCT ENROLLMENT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The invention relates generally to robot technology, and more particularly to an enrollment system that automatically captures various properties of a product for robotic manipulation.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

An e-commerce company often has as many as millions of products (SKUs). For manipulation of these products, information about the products needs to be extracted. Today, it is a common practice to manually capture the information of the product when needed. However, the manual method is not a scalable way to enroll those millions of products.

Therefore, there is a need to address the aforementioned deficiencies and inadequacies in the art.

SUMMARY OF THE INVENTION

In certain aspects, the present invention relates to a system for automatic product enrollment. In certain embodiments, the system includes: a belt conveyor system having a first end and a second end, configured to convey a product from the first end to the second end; a transparent panel, disposed in a path of the conveyor belt; a plurality of scales, disposed at the second end (or alternatively the first end), and configured to record weights of the product at different points; a plurality of RGB cameras, respectively disposed above the transparent panel, under the transparent panel, and above the scales, and configured to capturing visual images of the product; a plurality of depth cameras, respectively disposed above and under the transparent panel, and configured to capturing depth images of the product; a plurality of lights, disposed above and under the transparent panel, and configured to light up the product; and a computing device. The computer device is configured to: detect identifications of the product from the captured visual images; construct three-dimensional (3D) model with appearance using the captured visual images and depth images; calculate weight distribution of the product based on the 3D model with appearance, the captured visual images (or/and depth images) of the product when the product is located on the scales for recording weights, and the recorded weights of the product; determine manipulation parameters of the product based on the 3D model with appearance, and the weight distribution of the product; and enroll the warehouse information, the 3D model with appearance, the weight distribution, and the manipulation parameters of the product in a product database. The manipulation parameters include grasping surface(s) of the product, and grasping point(s) on the grasping surface(s).

In certain embodiments, the computing device is further configured to: send the enrolled information of the product from the product database to the warehouse management system and other devices and equipment in a warehouse.

In certain embodiments, the identification of the product comprises a tag, an Apriltag, a quick response (QR) code, an one-dimensional (1D) or a two-dimensional (2D) barcode, a watermark, or the 3D model with appearance.

In certain embodiments, the computing device is further configured to store one or more captured visual images in the product database.

In certain embodiments, the system further comprises an opaque housing enclosing the conveyor belt, the transparent panel, the scales, the RGB cameras, the depth cameras, the lights, and the computing device:

In certain embodiments, the system further comprises a rig disposed around the conveyor belts. The RGB cameras, the depth cameras, and the lights are mounted on the rig.

In certain embodiments, the rig comprises an upper layer, a middle layer, and a lower layer, the conveyor belts are located between the middle layer and the lower layer, and the RGB cameras, the depth cameras, and the lights are respectively placed on all the three layers of the rig.

In certain embodiments, the belt conveyor system comprises a first conveyor belt having the first end and a second conveyor belt having the second end, the transparent panel is placed between the first conveyor belt and the second conveyor belt, a top plate is placed on top of the scales, and top surfaces of the first conveyor belt, the second conveyor belt, and the transparent panel are at a same planes as the top plate.

In certain embodiments, the transparent panel has a first corner and a second corner at two ends of a diagonal line of the transparent panel, the depth cameras comprise a first depth camera disposed above the first corner and a second depth camera disposed under the second corner.

In certain aspects, the present invention relates to a system for automatic product enrollment. In certain embodiments, the system includes: a plurality of visual sensors, configured to capture images of a product; a plurality of scales, configured to measure weight distribution of the product; and a computing device, in communication with the visual sensors and the scales. The computing device is configured to: construct a 3D model with appearance of the product using the captured images; and enroll the 3D model, and the weight distribution of the product into a product database. In certain embodiments, the computing device is further configured to determine identification of the product based on the captured images, retrieve warehouse information of the product based on the identification, and enroll the warehouse information into the product database.

In certain embodiments, the computing device is further configured to provide manipulation suggestion for the product based on at least one of the warehouse information, the 3D model with appearance, and the weight distribution of the product. The manipulation suggestion includes at least one grasping surface of the product, and at least one grasping point on the grasping surface.

In certain embodiments, the system further includes: a belt conveyor system having a first end and a second end, configured to convey a product from the first end to the second end; and a transparent panel disposed in a path of the belt conveyor system. The scales are disposed at the second end.

In certain embodiments, the transparent panel has a first corner and a second corner at two ends of a diagonal line of the transparent panel, and the visual sensors comprise: a plurality of RGB cameras, respectively disposed above the transparent panel, under the transparent panel, and above the scales; a first depth camera disposed above the first corner; and a second depth camera disposed under the second corner.

In certain aspects, the present invention relates to a method for automatic product enrollment. In certain embodiments, the method includes: capturing images of a product by a plurality of visual sensors; measuring weight distribution of the product by a plurality of scales; constructing a 3D model of the product using the captured images by a computing device, wherein the computing device is in communication with the visual sensors and the scales; and enrolling the warehouse information, the 3D model, and the weight distribution of the product into a product database.

In certain embodiments, the capture images include images of each of the sides or side surfaces of the product, the 3D model includes appearance of all sides of the product.

In certain embodiments, the method further includes: determining identification of the product using the capture images; retrieving warehouse information of the product base on the identification, and enrolling the warehouse information of the product into the product database.

In certain embodiments, the method further includes: providing manipulation parameters of the product based on at least one of the warehouse information, the 3D model, and the weight distribution of the product. The manipulation parameters includes one or a few grasping surfaces of the product, and one or more grasping points on each grasping surface.

In certain embodiments, the method further includes: providing a belt conveyor system having a first end and a second end for conveying the product from the first end to the second end; providing a transparent panel disposed in a path of the belt conveyor system; and placing the scales at the second end.

In certain embodiments, the transparent panel has a first corner and a second corner at two ends of a diagonal line of the transparent panel, and the method further includes: respectively placing the RGB cameras above the transparent panel, under the transparent panel, and above the scales; placing a first depth camera above the first corner; and placing a second depth camera under the second corner.

In certain aspects, the present invention relates to a non-transitory computer readable medium storing computer executable code. The computer executable code, when executed at a processor of the computing device, is configured to perform the method described above.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

The description will be made as to the embodiments of the present invention in conjunction with the accompanying drawings. In accordance with the purposes of this invention, as embodied and broadly described herein, this invention, in certain aspects, relates to a system for automatic product enrollment, and an automatic enrollment method. The system provides an efficient way to enroll various properties of millions of products, so that the products can be manipulated by robots such as picked from a bin, stacked or packaged based on the automatically enrolled properties and manipulation suggestions based on the enrolled properties. The enrolled properties include, among other things, (1) three-dimensional (3D) model of the product; (2) images of the product from different view angles; (3) barcode location(s); and (4) weight and weight distribution of the product or the package of the product.

Figure 1:
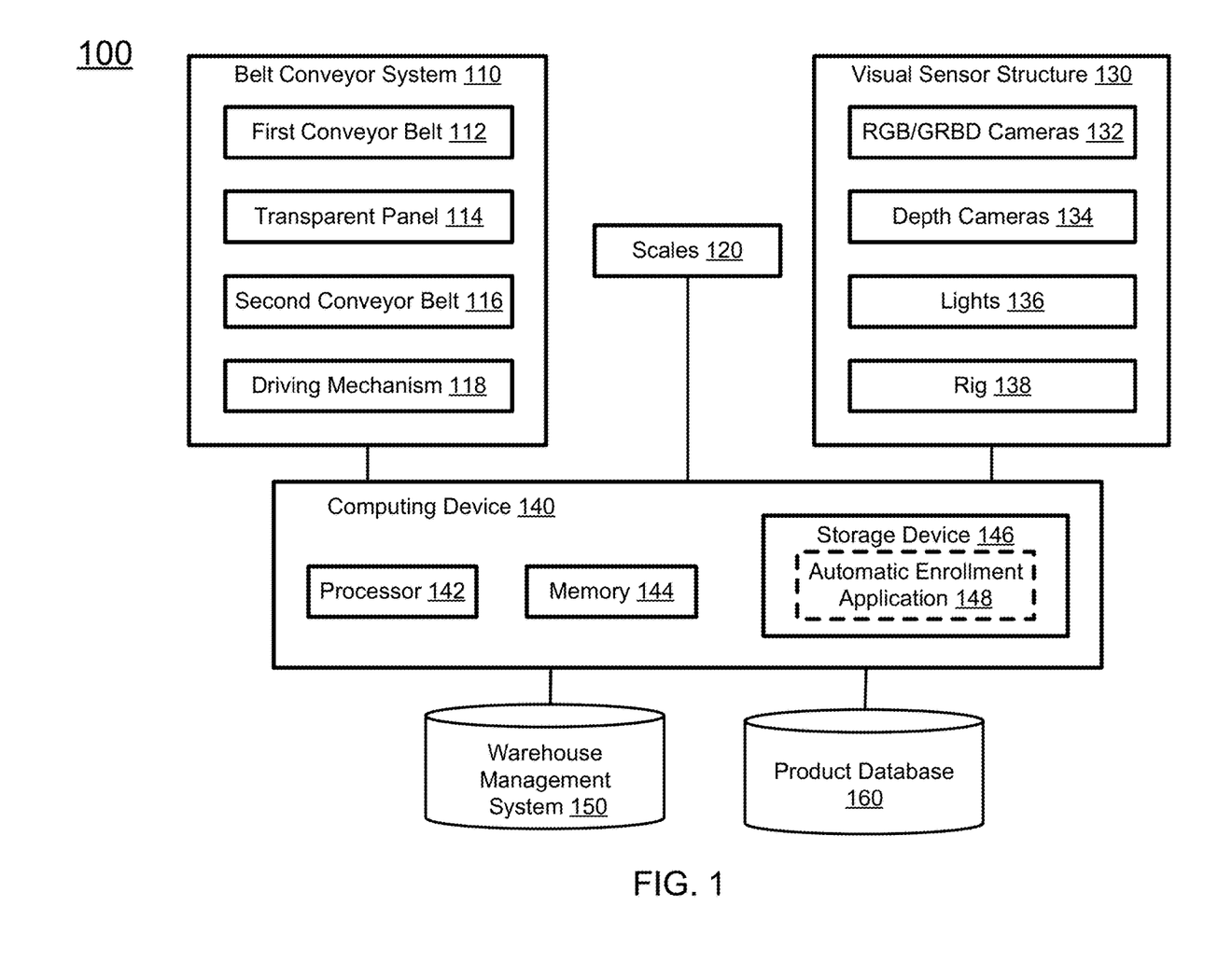
FIG. 1 is a schematic view of an automatic product enroll system according to certain embodiments of the present invention.

FIG. 1 is a schematic view of an automatic product enrollment system according to certain embodiments of the present invention. As shown in FIG. 1, the enrollment system 100 includes a belt conveyor system 110, a plurality of scales 120, a visual sensor structure 130, a computing device 140, a warehouse management system (WMS) 150, and a product database 160. The computing device 140 is configured to communicate with the belt conveyor system 110, the scales 120, the visual sensor structure 130, and the WMS 150, and enroll product information into the product database 160.

The belt conveyor system 110 is configured to move a product 102 from a first end to an opposite, second end. The belt conveyor system 110 includes a first conveyor belt 112, a transparent panel 114, a second conveyor belt 116, and a driving mechanism 118. The first conveyor belt 112, the transparent panel 114, the second conveyor belt 116, and the scales 120 are sequentially arranged from the first end to the second end. Upper surfaces of the first conveyor belt 112, the transparent panel 114, the second conveyor belt 116, and the scales 120 are flush or in other words, leveled with each other.

Figure 2:
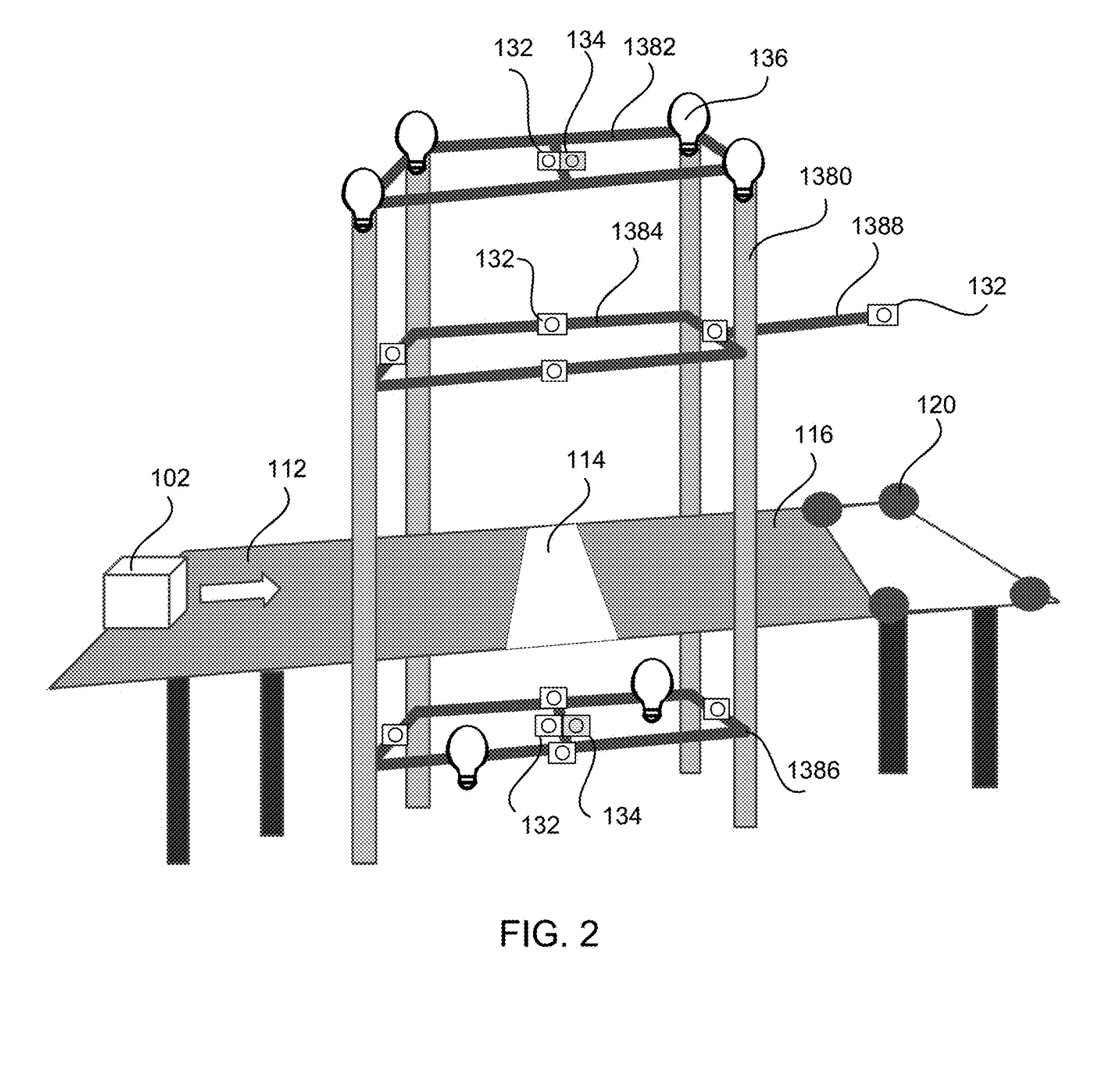
FIG. 2 is a schematic view of a part of the automatic product enroll system of FIG. 1.

The first conveyor belt 112 and the second convey belt 116 may be independent conveyor systems. In certain embodiments, the first and second convey belts 112 and 116 may be synchronized with each other. In certain embodiments, there may be only one convey belt which is transparent, and the separate transparent panel 114 is not needed. As shown in FIG. 2, each of the first and second conveyor belts 112 and 116 may include two pulleys and a belt rotates about the two pulleys. One of the two pulleys is a drive pulley that is driven by the driving mechanism 118, and the other one of the two pulleys is a drive pulley or an idler pulley. In certain embodiments, each conveyor belts 112 and 116 may also include other idler pulleys, to assist smooth operation of the conveyor belts. For brevity, other structure components of the belt conveyor system 110, such as frames, gears, bearings, motor, etc., are not shown in the figures. The driving mechanism 118 is configured to drive the conveyor belts 112 and 116, and may include one or more motors, gears, gear reducers, etc.

Figure 3:
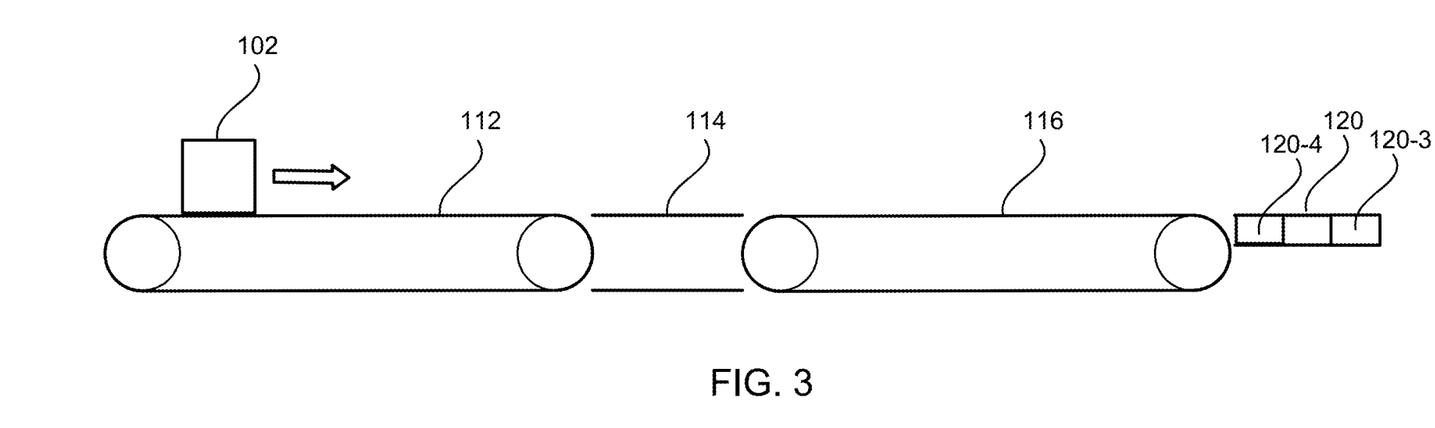
FIG. 3 is a schematic view of a belt conveyor system in the automatic product enroll system according to certain embodiments of the present invention.

The transparent panel 114 is transparent, such that the visual sensors below the transparent panel 114 may capture images of the product 102 above the transparent panel 114. In certain embodiments, the transparent panel 114 is made of fiber glass. As shown in FIG. 2 and FIG. 3, the transparent panel 114 is placed between the first conveyor belt 112 and the second conveyor belt 116. The distance between the transparent panel 114 to the first conveyor belt 112 and the second conveyor belt 116 is smaller than the minimal stable dimension of a potential product, such that the product 102, such as a soft package, will not stuck between the transparent panel 14 and any one of the first and second conveyor belts 112 and 116. The length of the transparent panel 14 along the moving direction of the first and second conveyor belts 112 and 116 is large enough such that the visual sensors below the transparent panel 114 detects or takes images of the product 102 easily when the product passes through. On the other hand, since the transparent panel 114 is stationary, the length of the transparent panel 114 should be short enough such that the product 102 will not stuck on the transparent panel 114. In certain embodiments, the product 102 is moved on the transparent panel 114 by at least one of the conveyor belt 112 and the conveyor belt 116 at any time. In other embodiments, when the product 102 is small and can completely stand on the transparent panel 114 without contacting with any of the conveyor belts 112 and 116, the product 102 may also be pushed through the transparent panel 114 by another product at the first end side of the product 102. In certain embodiments, the length of the transparent panel 114 along the moving direction of the conveyor belts 112 and 116 is in a range of 0.5-100 centimeters (cm). In certain embodiments, the length of the transparent panel 114 is in a range of 0.5-20 cm. In one embodiment, the length of the transparent panel 114 is about 1-2 cm. In certain embodiments, the belt of the belt conveyor system 110 is transparent. In that case, only one conveyor belt is needed, and the transparent panel 14 is not necessary. In certain embodiments, one of the conveyor belts 112 and 116 is transparent, and the transparent panel 114 is not needed. Under this situation, the transparent belt may be located at the first end side or the second end side. In certain embodiments, the scales 120 has a transparent upper panel, visual sensors are placed above and below the scales 120, the transparent panel 114 is not required, and only one of the conveyor belts 112 and 116 is needed. In certain embodiments, the transparent panel 114 may be located at the first end or second end of the conveyor belt, and thus only one of the conveyor belts 112 and 116 is needed.

Figure 4A:
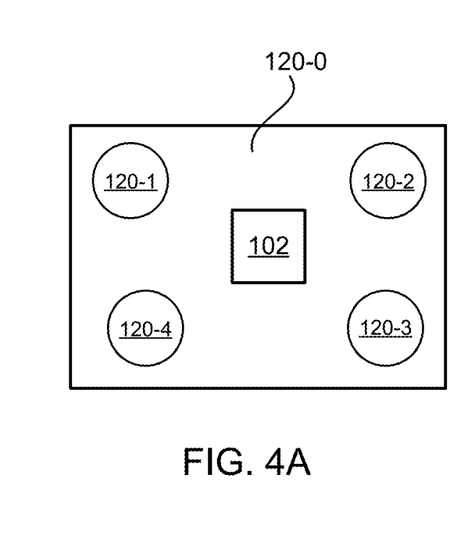
FIGS. 4A-4C are schematic views of scales in the automatic product enroll system according to certain embodiments of the present invention.
Figure 4B:
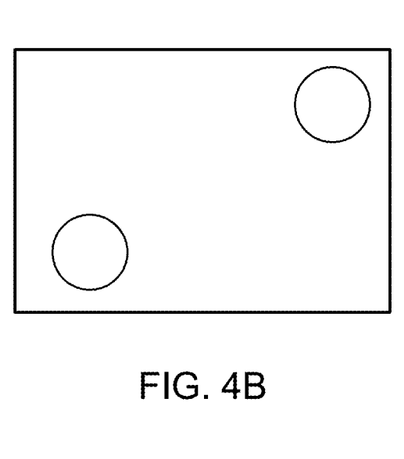
Figure 4C:
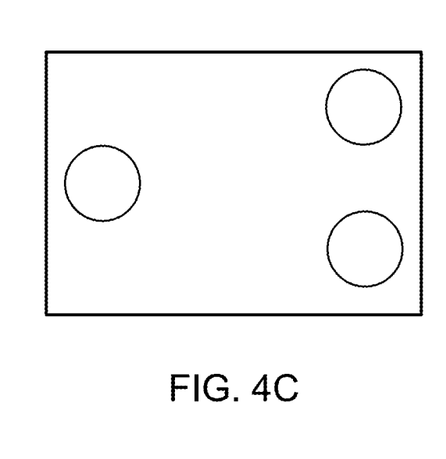

The scales 120 are disposed at the second end of the belt conveyor system 110, and configured to measure the weight and weight distribution of the product 102. As shown in FIG. 3 and FIG. 4A, the scales 120 include a top plate 120-0 and four scales 120-1, 120-2, 120-3, and 120-4 disposed under four corners of the top plate 120-0. In certain embodiments, the top plate 120-0 is a rigid plate that covers on the four scales. In other embodiments, the top surfaces of the scales 120-1, 120-2, 120-3, and 120-4 may also be portions of the top surface of the top plate 120-0. As shown in FIG. 4A, when the product 102 is moved onto the top plate 120-0, the position of the product 102 can be determined by the computing device 140 based on the images captured by the visual sensors at real time. At the same time, the four scales 120-1, 120-2, 120-3, and 120-4 respectively record the weight of the product 102 at four corners, and send the weight to the computing device 140. The weight distribution of the product 102 then can be calculated by the computing device 140, based on the pose of the product 102, the recorded weights by the four scales, and the three-dimensional model of the product 102. In this embodiment, the four scales are disposed at four corners of the scales 120. In other embodiments, the scales 120 may also include two, three, or more than four scales. In certain embodiments, as shown in FIG. 4B, when the scales 120 includes two scales, the two scales may be disposed at two corners of the scales 120 along a diagonal line of the top plate 120-0. In certain embodiments, as shown in FIG. 4C, when the scales 120 includes three scales, one of the scales may be disposed at a middle point of one side of the top plate 120-0, and the other two scales may be disposed at two corners of the other side of the top plate 120-0.

The visual sensor structure 130 is configured to, among other things, simultaneously capture 3D model information and appearance of the product 102. Referring to FIG. 1, the visual sensor structure 130 includes a plurality of red, green and blue (RGB) or RGB depth (RGBD) cameras 132, a plurality of depth cameras 134, a plurality of lights 136, and a rig 138. In certain embodiments, the depth cameras 134 are time-of-flight (ToF) cameras. When RGBD cameras are available, the visual sensor structure 130 may not need to include depth cameras. In certain embodiments, the visual sensor structure 130 may include one or more laser scanners, and the laser scanner is configured to capture identifications, such as barcode shown in the outer surface of the product 102. In certain embodiments, the laser scanner may also be a lidar, which can be used to construct 3D model of the product 102.

As shown in FIG. 2, the rig 138 has vertical columns 1380 and three horizontal layered structure. The three horizontal layers are an upper layer 1382, a middle layer 1384, and a lower layer 1386. The upper layer 1382 is placed above the middle layer 1384, the middle layer 1384 is placed above the transparent panel 114, and the lower layer 1386 is placed below the transparent panel 114. In certain embodiments, based on the number of visual sensors needed, the rig 138 may also have less than or greater than three layers. For example, the rig 138 may have two layers, with one layer placed above the belt conveyor system 110, and the other layer placed below the belt conveyor system 110. In certain embodiments, the distance between the upper layer 1382, the middle layer 1384, and the lower layer 1386 and horizontal plane of the conveyor belts 112/116 and transparent panel 114 are respectively in a range of 40-700 cm, 20-350 cm, 5-80 cm. In certain embodiments, the distance between the upper layer 1382, the middle layer 1384, and the lower layer 1386 and the conveyor belts 112, 116/transparent panel 114 are respectively in a range of 100-400 cm, 50-200 cm, and 10-40 cm. In certain embodiments, the distance between the upper layer 1382, the middle layer 1384, and the lower layer 1386 and the conveyor belts 112, 116/transparent panel 114 are about 200 cm, 100 cm, and 20 cm. In certain embodiments, the heights of at least one of the upper layer 1382, the middle layer 1384 and the lower layer 1386 are adjustable. In other words, the three layers can be moved up and down along the columns 1380, such that the system is usable for different sizes of product 102. In certain embodiments, the height adjustment of the layers is controlled by the computing device 140 automatically, and when the product 102 is loaded on the conveyor belt and before entering the area of the rig 138, some images captured by the RGB cameras 132 and depth cameras 134 is used by the computing device 140 to estimate the size of the product 102, so as to trigger the height adjustment of the layer 138 to a level that suitable for capturing images of the product 102 when the product 102 is substantially located just above the transparent panel 114 or located in the center of the rig 138.

The RGB cameras 132, the depth cameras 134, and the light 136 are installed on the three layers or the columns of the rig 138. As shown in FIG. 2, the RGB (or RGBD) cameras 132 are placed on all three layers. One RGB camera 132 is placed in the center of the upper layer 1382, four RGB cameras 132 are respectively placed at the centers of four sides of the middle layer 1384, and four RGB cameras 132 are respectively placed at the center of four sides, and the center of the lower layer 1386. In certain embodiments, the layer 1382 and the middle layer 1384 may combined as one layer, and the arrangement of the RGB cameras and depth cameras on the combined layer is the same as that on the lower layer 1386. In certain embodiments, Because the view of the product 102 from under the transparent panel 114 is difficult, and the view of the side surfaces of the product 102 from under the transparent panel 114 is not necessary, the lower layer 1386 may only have one center RGB camera 132 and one depth camera 134 placed at the center of the lower layer 1386. In one embodiment. Three RGB cameras 132 are placed on the lower layer 1386 along a center line under the transparent panel 114, where one of them is located at the center, and the other two are located at centers of two sides. In addition, an extension 1388 is extended from the middle layer 1384 toward the moving direction of the product 102, and a RGB camera 132 is placed on the extension 1388, and above the scales 120, such that the images of the product 102 can be taken clearly when the product stands on the scales 120 for measuring weight. In certain embodiments, a depth camera may be placed on the extension 1388 and above the scales 120 to capture depth images of the product 102 when the product 102 is placed on the scales 120 for measuring weight.

Figure 5A:
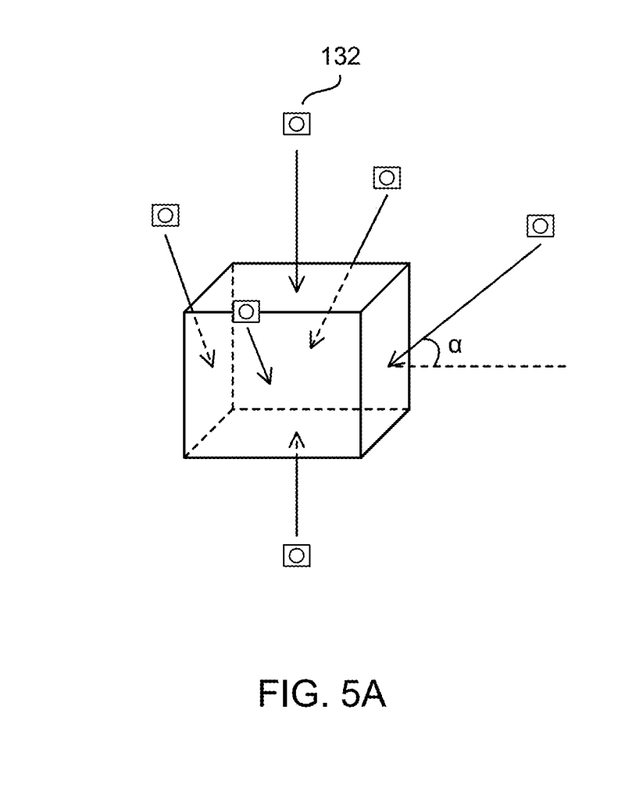
FIG. 5A is a schematic view showing arrangement of RGB cameras according to certain embodiments of the present invention.

In certain embodiments, the product 102 is shown in FIG. 5A as a cuboid box. As shown in FIG. 5A, in order to capture surfaces of the product 102 from different angles, RGB cameras 132 are placed from the top, the bottom, and four upper sides of the product 102. When the product 102 is located on the center of view of the RGB cameras 132, such as located on the transparent panel 114, the top RGB camera captures an image from above the upper surface of the product 102, and the image capture direction of the top RGB camera is substantially perpendicular to the upper surface of the product 102. Each of the side cameras 132, on the other hand, may capture an image of the corresponding side surface, and the angle α shown in FIG. 5A is preferably about 45 degrees. In this way, the RGB cameras 132 respectively capture a clear image of each of the top and four side surfaces of the product 102. The bottom surface can also be captured by the RGB camera 132 from under the transparent panel 114. Because the length of the transparent 114 along the moving direction of the conveyor belt is likely smaller than the length of the product 102 along the moving direction, the RGB camera 132 is designed to capture multiple images when the product 102 moves through the transparent panel 134, and combine those images to obtain the complete image of the bottom surface of the product 102.

Figure 5B:
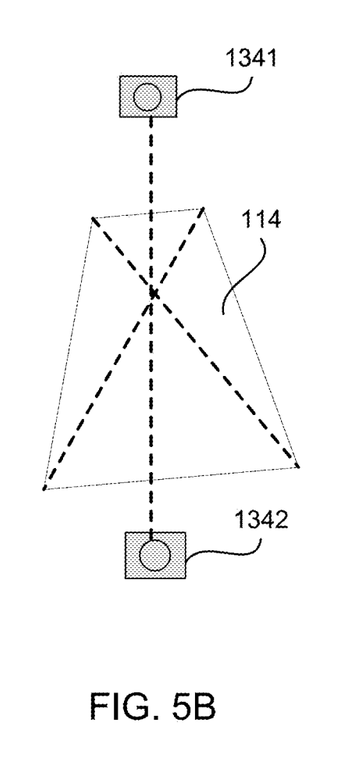
FIGS. 5B and 5C are schematic views showing arrangement of depth cameras above and under a transparent panel according to certain embodiments of the present invention.
Figure 5C:
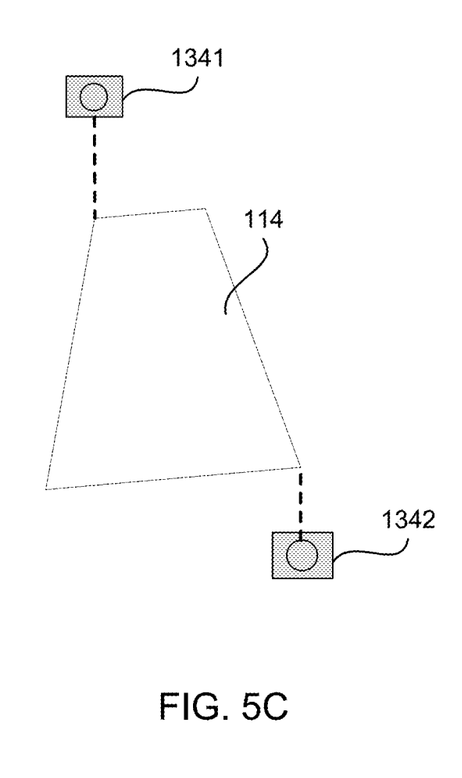

There are at least two depth cameras 134, and the two depth cameras 134 are substantially placed at the center of the upper layer 1382 and the center of the lower layer 1386. In certain embodiments, as shown in FIG. 2 and FIG. 5B, the projections of the two depth cameras 134 on the transparent panel 114 are basically the center of the transparent panel 114. In certain embodiments, as shown in FIG. 5C, the transparent panel 114 has opposite corners at two ends of a diagonal line of the transparent panel 114, one depth camera 134 is located above one corner of the transparent panel 114, and the other depth camera 134 is located below the other corner of the transparent panel 114. By this type of design, the depth cameras 134 are configured to capture more accurate depth images of the product 102 when the product 102 stands on the transparent panel 114. The RGB images show the appearance of the six side surfaces of the product 102, including but not limited to the size, the barcode and pictures on the surfaces. Further, those RGB images, optionally combined with the depth images, are used to construct a 3D model of the produce 102.

The lights or light sources 136 are mounted on the rig 138, and configured to provide consistent lighting condition and reduce shadow and glare. In certain embodiments, the light sources 136 preferably provide diffused light. Referring to FIG. 2, four lights 136 are placed at four corners of the upper layer 1382, and two lights 136 are placed at two sides of the lower layer 1386. In certain embodiments, each of the two lights of the lower layer 1386 is placed at $^{1}/_{4}$ of the corresponding sides, so as to avoid physical interference with the RGB camera 132, the depth camera 134 and the lights 136 installed on the low layer 1386. In certain embodiments, an opaque box around the rig or replacing the rig may be provided to reduce or eliminate the external light sources, such that the environment within the box has a consistent light condition. In certain embodiments, the lights 136 are manually controlled. In certain embodiments, the lights 136 are controlled by a specific controller. In certain embodiments, the lights 136 are controlled by the computing device 140, to turn certain lights 136 on and off, or to adjust intensity and optionally orientation of the lights 136.

In certain embodiments, the structure of the rig 138, and the arrangement of the RGB cameras 132, the depth cameras 134 and the light 136 may vary depending on their respective characteristics.

The computing device 140 may be a server computer, a cluster, a general-purpose computer, a specialized computer, a tablet, a smart phone, or a cloud-based device. In certain embodiments, the computing device 140 is a server computer to store and processing information collected from the scales 120, the visual sensors 130, and the WMS 150. As shown in FIG. 1, the computing device 140 may include, without being limited to, a processor 142, a memory 144, and a storage device 146. In certain embodiments, the computing device 140 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 142 controls operation of the computing device 140. In certain embodiments, the processor 142 may be a central processing unit (CPU). The processor 142 can execute an operating system (OS) or other applications of the computing device 140. In some embodiments, the computing device 140 may have more than one CPU as the processor, such as two CPUs, four CPUs, eight CPUs, or any suitable number of CPUs.

The memory 144 can be a volatile memory, such as the random-access memory (RAM), for storing the data and information during the operation of the computing device 140. In certain embodiments, the memory 144 may be a volatile memory array. In certain embodiments, the computing device 140 may run on more than one memory 144.

The storage device 146 is a non-volatile data storage media or device for storing the OS (not shown) and other applications of the computing device 140. Examples of the storage device 146 may include flash memory, memory cards, USB drives, hard drives, floppy disks, optical drives, or any other types of data storage devices. In certain embodiments, the computing device 140 may have multiple storage devices 146, which may be identical storage devices or different types of storage devices, and the applications of the computing device 140 may be stored in one or more of the storage device 146 of the computing device 140. The storage device 146 includes an automatic enrollment application 148, which is configured to retrieving data of a product and process the data, and enroll the processed data in the product database 160.

Figure 6:
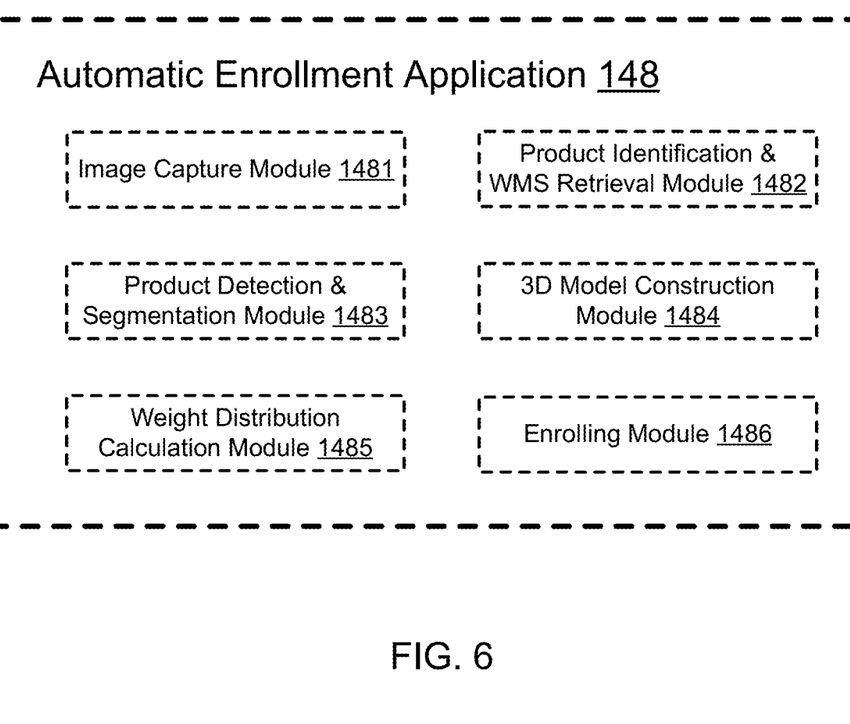
FIG. 6 is a schematic view of an automatic enrollment application according to certain embodiments of the present invention.

FIG. 6 schematically depicts the structure of the automatic enrollment application 148 according to certain embodiments of the present invention. As shown in FIG. 6, the automatic enrollment application 148 may include, among other things, an image capture module 1481, a product identification and warehouse information retrieval module 1482, a product detection and segmentation module 1483, a 3D model construction module 1484, a weight distribution calculation module 1485, and an enrolling module 1486.

The image capture module 1481 is configured to control the RGB or RGBD cameras 132 and the depth cameras 134 to capture images. In certain embodiments, the image capture module 1481 may be further configured to, when a laser scanner is used, control the laser scanner to scan the product 102. In certain embodiments, the image capture module 1481 may also passively receive images captured by the RGB/RGBD cameras 132 and the depth cameras 134. After obtaining the images, the image capture module 1481 may further pre-process the images. The pre-process may include, among other things, synchronizing the RGB images and the depth images, adjusting light balance of the images, reformatting the images, and resizing the images. The image capture module 1481 then sends the processed RGB images to the product identification and WMS retrieval module 1482, and sends the processed RGB images and depth images to the product detection and segmentation module 1483. In certain embodiments, when a laser scanner is used, the image capture module 1481 will then send the scanned information to the product identification and WMS retrieval module 1482.

The product identification & WMS retrieval module 1482 is configured to, upon receiving the RGB images or laser scanned information, identify the labels from the RGB images or scanned information. The labels include 1D or 2D barcode, Apriltags, quick response (QR) codes, watermarks, or the like. The obtained labels are referred to as the identification of the product 102. In certain embodiments, the 3D model of the product 102 with side surface appearance information may also be used as the identification of the product 102. When the identification of the product 102 is obtained, the product identification and WMS retrieval module 1482 then can retrieve the WMS information of the product 102 from the WMS 150 or database of the WMS 150. The WMS information of the product 102 may include receiving date, inventory, weight, product category, and other information related to the product 102. In certain embodiments, the identification of the product 102 may be used later to index the information of the product 102 and enroll those information in the product database 160. When the identification of the product 102 is used for indexing, the product identification and WMS retrieval module 1482 may send the identification to the product detection and segmentation module 1483, such that the following processing of the product information is linked to that identification index.

The product detection and segmentation module 1483 is configured to, upon receiving the RGB images and the depth images, detect the product and segment the product. A background depth and appearance model of the empty conveyor belt is built beforehand. By comparing the empty conveyor belt model with the current depth and appearance of the conveyor belt, the disclosed product detection and segmentation module 1483 detects the difference and extract the product on the conveyor belt based on analysis of the difference. Specifically, the product detection and segmentation module 1483 partitions each image into a set of segments, so as to extract the location, boundaries, point clouds and sent the information to the 3D model construction module 1484.

The 3D model construction module 1484, upon receiving the segmented RGB images and depth images, is configured to construct a 3D textured model of the product 102. In certain embodiments, the 3D model is constructed by triangulation using at least two RGB images. In certain embodiments, the use of the depth images improves the speed and accuracy of constructing the 3D model of the product 102. Because the 3D model is a texture model, the 3D model not only includes dimensions of the product, but also the appearance of the product, for example, each of the side surfaces of the 3D model. Therefore, the 3D model, of for example a cuboid shaped product, includes the dimensions of the product and appearance of the six surfaces of the product. Each of the six surfaces includes, if available, labels and images on that surface. In certain embodiments, the appearance in the 3D model is in color.

The weight distribution calculation module 1485 is configured to control the scales 120 to weight the product 102. In certain embodiments, when the product 102 is placed on the top plate 120-0 of the scales 120, the product 102 is maintained still for a short period of time, so that the reading of the scales 120 is stable. The stable readings of the scales 120 is then recorded. The position and orientation, i.e. pose, of the product 102 on the scales 120 is also recorded by the RGB camera 132 disposed above the scales 120. In certain embodiments, the scales 120 itself may also be a conveyor belt structure, so as to move in the product 102, maintain the product 102 still for a while, and then move the product 102 out. In certain embodiments, a depth camera 134 is available to take depth images of the product 102, so as to assist the determination of the pose of the product 102.

In certain embodiments, the weight distribution calculation module 1485 may simply read and record the scales 120 continuously until the recording is stable, and the pose of the product 102 is also calculated based on the captured images during the measuring. Upon receiving or retrieving the reading of the scales 120, the weight distribution calculation module 1485 is configured to calculate the weight distribution of the product 102. The calculation of weight distribution is based on the real-time image taken by the RGB camera 132 placed above the scales 120, the 3D model of the product 102, and the weight measured by the scales 120. In certain embodiments, the scales 120 are preferably placed at the second end of the belt conveyor system 110. Therefore, when the weight measurement and weight distribution calculation is performed, the computing device 140 already has the 3D model of the product 120, and the pose of the product 120, which are used for the calculation.

In certain embodiments, the weight distribution of the product 102 may be described as a relative location of the center of mass (or center of weight) to the center computed from the geometrical shape of the product. In certain embodiments, the weight distribution of the product 102 may be described as a relative location of the center of mass (or center of weight) to the center computed from the geometrical shape of the product when the product is on different poses such as which side faces up. The location of the true center of mass vs. the center computed from the shape of the object will be used to determine the grasping point on based on the pose of the product. For example, if a suction cup manipulator is used, the cup can grasp the product 102 by aiming the suction cup toward the center of mass instead of geometrical center.

The enrolling module 1486 is configured to, after receiving the warehouse information of the product 102, the 3D model with appearance of the product 102, and the weight distribution of the product 102, enroll those information into the product database 160. The enrollment data may be indexed using the identification of the product 102. In certain embodiments, the enrolling module 1486 further determines robotic manipulation suggestion of the product 102, based on the images, the 3D model with appearance, and the weight distribution of the product 102.

The WMS 150 is an independent platform for a warehouse, and is in communication with the computing device 140. In certain embodiments, the computing device 140 is a server computer, and the WMS 150 is part of the server computer 140.

The product database 160 is configured to store the enrolled information of the product 102, and may include WMS information, identification, varies view images, and weight distribution of the product 102. In certain embodiments, the computing device 140 is a server computer, and the product database 160 is part of the storage device 146. In certain embodiments, the product database 160 may also be stored in storage device separated or remote from the computing device 140. In certain embodiments, the product database 160 is stored in a cloud.

Figure 7A:
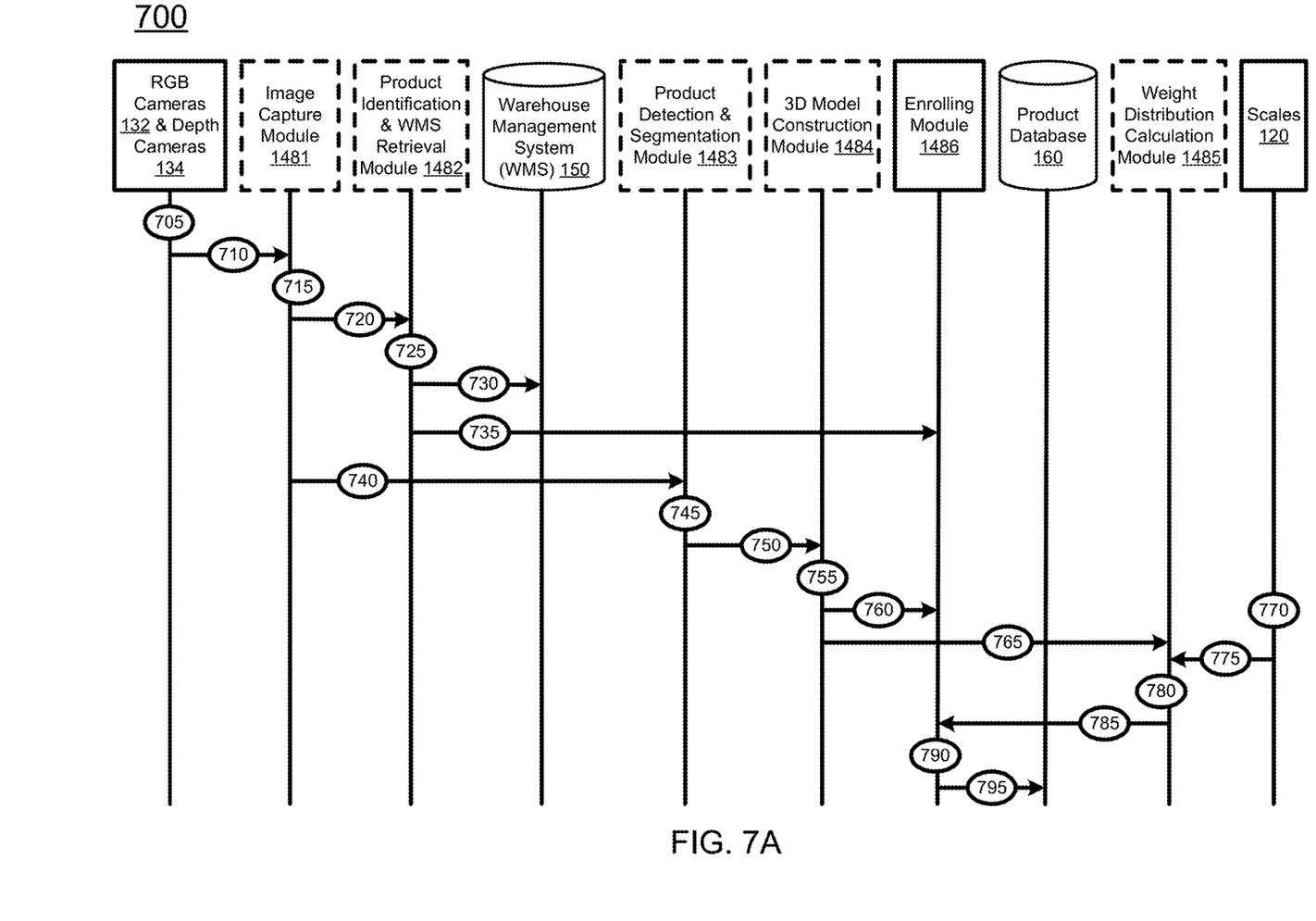
FIGS. 7A and 7B show a flowchart of automatic enrollment of a product according to certain embodiments of the present invention.
Figure 7B:
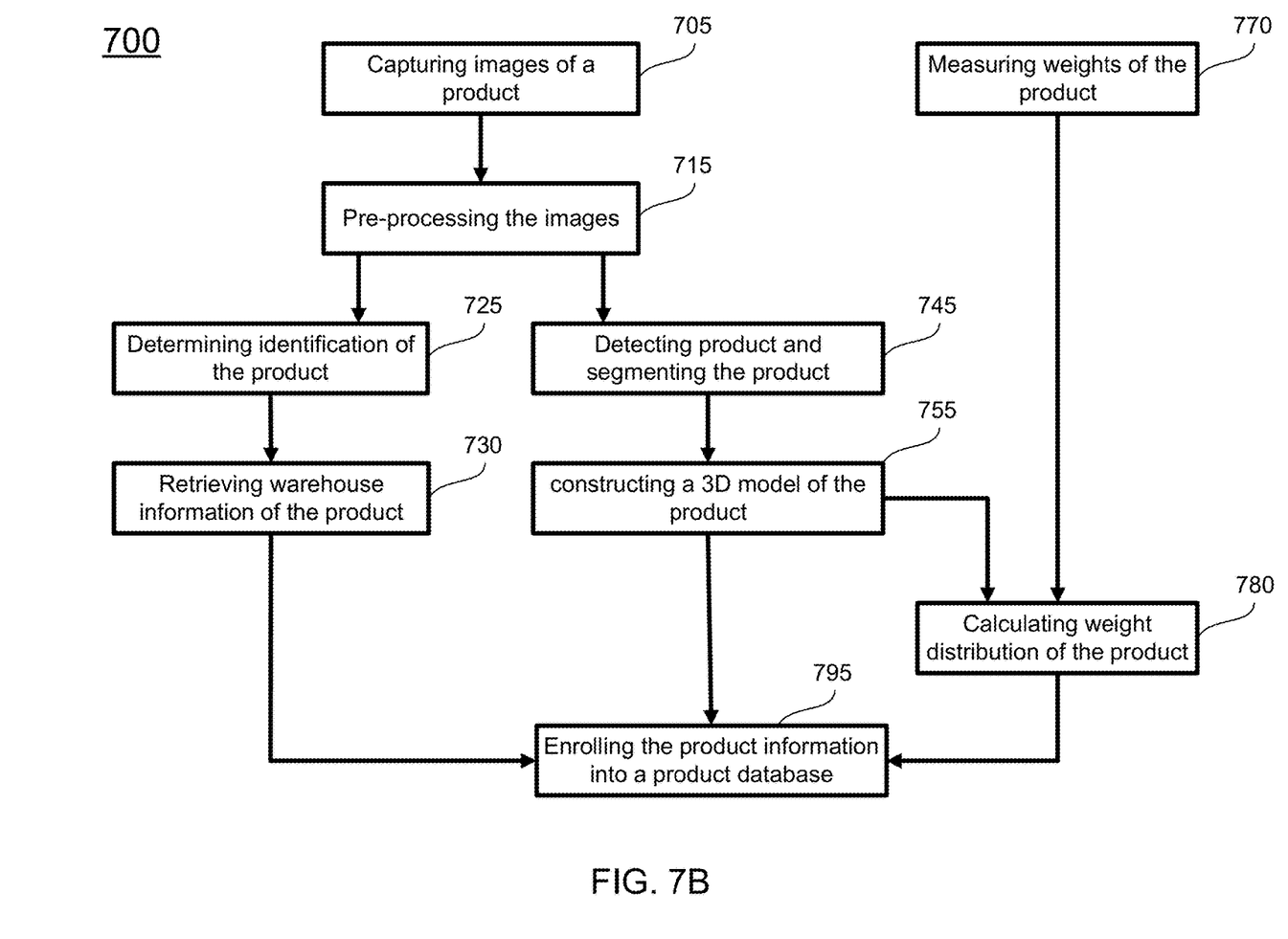

FIG. 7A and FIG. 7B schematically show a method of enrolling a product according to certain embodiments of the present invention. In certain embodiments, the method as shown in FIG. 7A and FIG. 7B may be implemented on an automatic product enrollment system as shown in FIG. 1. It should be particularly noted that, unless otherwise stated in the present invention, the steps of the method may be arranged in a different sequential order, and are thus not limited to the sequential order as shown in FIG. 7A and FIG. 7B.

As shown in FIG. 7A, when an automatic product enrollment system as shown in FIG. 1 is provided, and a product 102 is moved on the first conveyor belt 112, the transparent panel 114, the second conveyor belt 116, and onto the scales 120, at procedure 705, the RGB cameras 132 and the depth cameras 134 take a plurality of images of the product 102. The images are taken continuously, or else, may be taken when the product 102 is in the field of view. Each of the images has a respective time tag. When the RGB cameras 132 are RGBD cameras, it may not be necessary to have the depth cameras 134. In certain embodiments, the system 100 may further include one or more laser scanners to scan information such as barcode on the product 102. The RGB cameras 132, the depth cameras 134, and optionally the laser scanner may be controlled and operated by the image capture module 1481. In certain embodiments, the RGB cameras 132, the depth cameras 134, and optionally the laser scanner may also operate independently from the image capture module 1481, and are configured to send the captured images to the image capture module 1481.

At procedure 710, the RGB cameras 132 and the depth cameras 134 sends the captured images to the image capture module 1481. In certain embodiments, the image capture module 1481 may also retrieve the images from the RGB cameras 132 and the depth cameras 134.

Upon receiving or retrieving the images, at procedure 715, the image capture module 1481 pre-processes the images. In certain embodiments, the pre-processing may include synchronizing the RGB images and the depth images using their time tag, adjusting light balance of the images to compensate light variance in the images, and possibly reformatting and resizing the images when needed for different purposes.

After pre-processing the images, the image capture module 1481 sends certain pre-processed images to the product identification and WMS retrieval module 1482 at procedure 720, and sends certain pre-processed images to the product detection and segmentation module 1483 at procedure 740.

At procedure 725, upon receiving the pre-processed images from the image capture module 1481, the product identification and WMS retrieval module 1482 identifies the product 102 by extracting identification from the image of the product 102. The identification of the product 102 may include 1D and 2D barcode, Apriltags, QR code, image based and 3D model based matching, etc., which could be extracted from the pre-processed images and point cloud. In certain embodiments, the identification may also be extracted by a laser scanner. In certain embodiments, the image capture module 1481 only sends the RGB images to the product identification and WMS retrieval module 1482, but not the depth images.

Then at procedure 730, the product identification and WMS retrieval module 1482 retrieves warehouse information corresponding to the product 102 from the WMS 150, using the identification of the product obtained from procedure 725. The warehouse information of the product 102 may include, but not limited to, inventory, product category, known shape, weight, location of the barcode, etc.

After retrieving the warehouse information of the product 102, at procedure 735, the product identification and WMS retrieval module 1482 sends the identification and the retrieved warehouse information to the enrolling module 1486. In certain embodiments, the product identification and WMS retrieval module 1482 may also send the identification and the retrieved warehouse information directly to the product database 160.

At procedure 745, upon receiving certain pre-processed images from the image capture module 1481, the product detection and segmentation module 1483 detects the product 102 from the received images. The received pre-processed images may include pre-processed RGB images and pre-processed depth images. The detected product 102 may be different views of a cuboid box in the different images. Then the product detection and segmentation module 1483 segments the detected product 102 in those images. Specifically, the product detection and segmentation module 1483 partitions each of the images into multiple segments, and locates the products 102 and boundaries of the products 102 and the environment.

After product detection and segmentation, at procedure 750, the product detection and segmentation module 1483 sends the detected and segmented information to the 3D model construction module 1484.

Upon receiving those detected and segmented information, at procedure 755, the 3D model construction module 1484 builds a 3D model of the product 102. For example, if the product 102 is in a cuboid box structure, the 3D model will be a cuboid box, with accurate length, wide, and height. In addition, the pose of the 3D model in the environment is also calculated, where each of the faces of the cuboid box is determined, orientation of the cuboid box relative to the conveyor belt is determined, and distance between the cuboid box and the edges of the conveyor belt is determined. In certain embodiments, the 3D model further includes appearance information. For example, each of the six side surfaces of the cuboid box structure are included in the 3D model. The appearance includes those tags or images on the side surfaces, and may be colored. Therefore, the 3D model here is also named 3D model with appearance or textured 3D model.

After constructing the 3D model, at procedure 760, the 3D model construction module 1484 sends the 3D model to the enrolling module 1486. In certain embodiments, the 3D model construction module 1484 may also send the 3D model directly to the product database 160. In addition, at procedure 765, the 3D model construction module 1484 also sends the 3D model and certain product images, such as the images taken when the product 102 is on the scales 120, to the weight distribution calculation module 1485.

At procedure 770, when the product 102 moves onto the scales 120, the scales 120 measure the weight of the product 102. The measurement may be recorded by the scales 120 multiple times when the product 102 is completely standing on the scale plate 120-0. The measurement by the scales 120 may be after or before the 3D model construction of the product 120. But preferably, when the product 102 is on the scales 120, the 3D model has already been constructed, so that the length, width, height of the product 102 are available for the calculation of weight distribution.

After the measurement, at procedure 775, the scales 120 send the weight measurement to the weight distribution calculation module 1485.

At this time, the weight distribution calculation module 1485 has the weight measurement from the scales 120, and 3D model and certain images from the 3D model construction module 1484. The images include those RGB images taken when the product 102 is standing on the scales 120, so that the time of the images can be matched with the time of the weight measurement. In certain embodiments, the images may also be sent by the image capture module 1481 instead of the 3D model construction module 1484. In other embodiments, those images used by the weight distribution calculation module 1485 may also be received from the cameras 132/134, or the product identification and WMS retrieval module 1482, or the product detection and segmentation module 1483 when appropriate. Using 3D models, weight measurement, and images corresponding to the time of the weight measurement, the weight distribution can be calculated at procedure 780.

Figure 8:
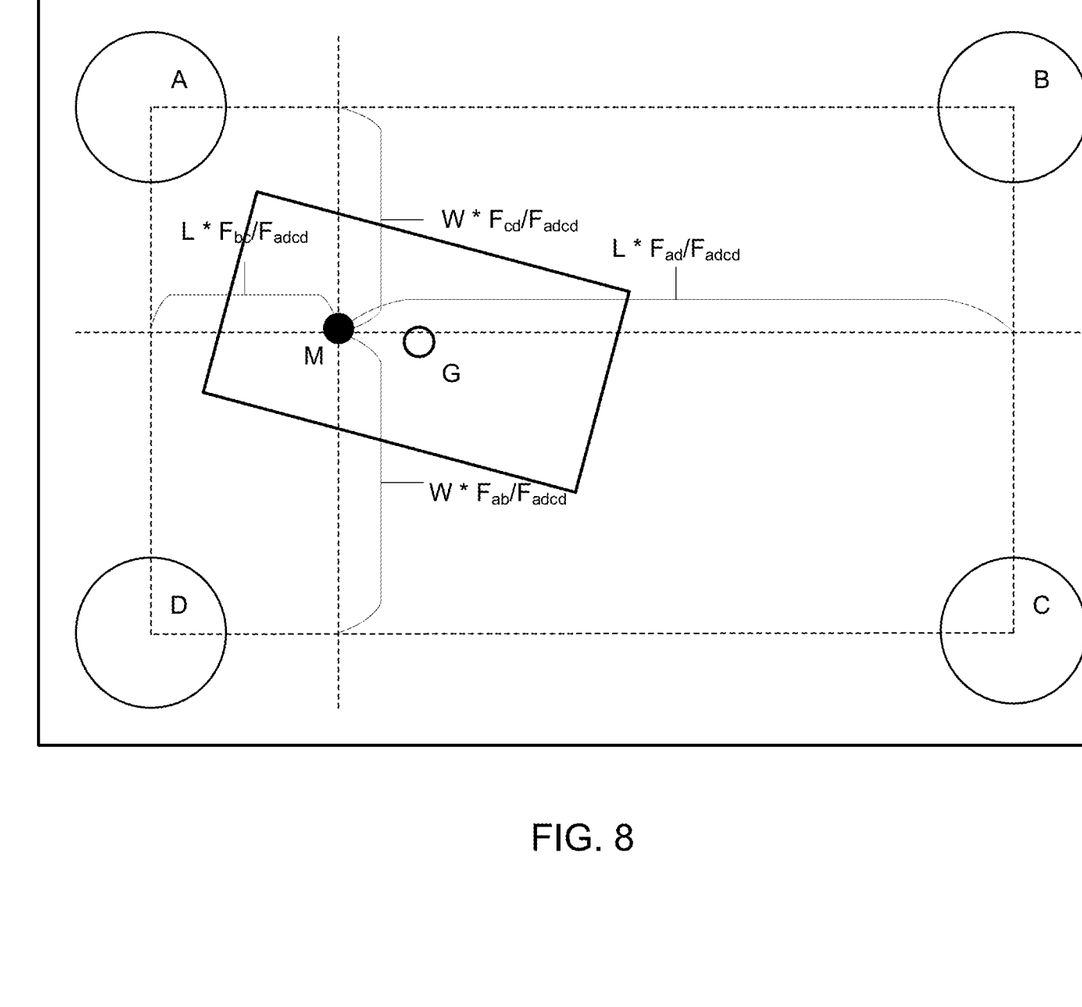
FIG. 8 is a schematic view of measuring weight distribution of a product according to certain embodiments of the present invention.

In certain embodiments, the weight distribution calculation is performed as shown in FIG. 8. Specifically, the product 102 is moved onto the top plate 120-0 of the scales. The scales A, B, C and D (or 120-1, 120-2, 120-3, and 120-4) are located under the product 102. The weights measure by the four scales are Fa, Fb, Fc and Fd. The total weights of the four scales are the sum of Fa, Fb, Fc and Fd, and named Fabcd. The sum of Fa and Fb is named Fab, the sum of Fb and Fc is named Fbc, the sum of Fc and Fd is named Fcd, and the sum of Fd and Fa is named Fad. The length of the scales is defined L (between the line connecting the scales A and D and the line connecting scales B and C), and the width of the scale is defined W (between the line connecting the scales A and B and the line connecting the scales C and D). The length of L may be the same, greater than, or less than the length of W, depending on the space required by the scales 150 and the sizes of the products to be weighted. The center of mass of product 102, projected on the top plate 120-0, along the length direction, is calculated to be in a distance of L×Fbc/Fabcd to the line connecting A and D, or to be in a distance of L×Fad/Fabcd to the line connecting B and C. The center of mass of product 102, projected on the top plate 120-0, along the width direction, is calculated to be in a distance of W×Fcd/Fabcd to the line connecting A and B, or to be in a distance of W×Fab/Fabcd to the line connecting C and D. Accordingly, the center of mass of the product 102 projected on the top plate 120-0 (shown by a solid circle M) is calculated. In comparison, the geometrical center of the product 102 is calculated through the 3D model. The geometrical center projected on the top plate 120-0 is shown as empty circle G. In certain embodiments, the arrangement of the product 102 standing on the current bottom surface is a main position for manipulation, and the center of mass of the product 102 in 3D is estimated by extending the point M upward half of the height H of the product 102. In certain embodiments, the product 102 may also be flipped three times to measure three projections of the center of mass, and the center of mass can be estimated more accurately using the three projections of the center of mass. After calculation of the weight distribution of the product 102, at procedure 785, the weight distribution calculation module 1485 sends the calculated weight distribution to the enrolling module 1486. In certain embodiments, the weight distribution calculation module 1485 may send the calculated weight distribution directly to the product database 160.

Now the enrolling module 1486 has the identification and the retrieved warehouse information of the product 102 received from the product identification and WMS retrieval module 1482, the 3D model of the product 102 received from the 3D model construction model 1484, the calculated weight distribution of the product 102 received from the weight distribution calculation module 1485, and images of the product 102. Then at procedure 790, the enrollment module 1486 compiles those data, for example, using the identification of the product 102 as index. In addition, the enrolling module 1486 may also determines manipulation suggestions based on those data. In certain embodiments, the enrolling module 1486 uses the weight distribution, or the center of mass of the product 102 together with 3D model with appearance, and optionally warehouse information, to determine certain manipulation parameters of variety of manipulators. For example, the enrolling module 1486 may first determine a grasping surface based on the dimension of the produce 102, or the smoothness or hardness of the surface, to determine one or more grasping surface. When the grasping surfaces are determined, the enrolling module 1486 further determines a grasping point on the surface based on the projection of the center of mass of the product 102 on that surface. In certain embodiments, the enrolling module 1486 determines the manipulation parameters based on the manipulators used.

After compiling and processing the received data, at procedure 795, the enrolling module 1486 then enrolls those data in the product database 160. The enrolled data are under the same entry for the product 102, and can be used later. For example, when a robotic device is used to operate the product 102, the robotic device can retrieve data of the product 102 from the product database 160. The retrieved information may include the dimensions of the product 102, the weight and weight distribution of the product 102, the smoothness of the surfaces of the product 102, the suggested manipulation operations of the product 102, etc. The information is helpful to assist the manipulation of the product 102 by a robotic device.

FIG. 7B is a flowchart of the method in a different format. As shown in FIG. 7B, at procedure 705, the RGB cameras 132 and the depth cameras capture images of a product 102. The computing device 140 receives those captured images, and pre-processes those images at procedure 715. Certain pre-processed images, such as some RGB images, are used to determine the identification of the product at procedure 725. The identification may be a barcode. At procedure 730, the computing device 140 retrieves WMS information corresponding to the product using the identification.

The pre-processed images, such as the RGB images and depth images, can be used at procedure 145 to detect the product from the images and segment the images. Those detected objects and segmented images are then used at procedure 755 to construct a 3D model of the product.

At procedure 770, multiple scales are used to measure the weight of the product. Based on the 3D model, the pose of the product on the scales, and the weight measurement, the weight distribution of the product can be estimated.

The computing device 140 then organizes those WMS information, 3D model, different image views, weight distribution, and possibly provide manipulation suggestions based on the above information, and enroll all the data into the product database 160. With the data of the product available, other devices, such as a robotic device, can retrieve those data to instruct how to manipulate the product 102.

In certain aspects, the present invention relates to a non-transitory computer readable medium storing computer executable code. In certain embodiments, the computer executable code may be the software stored in the storage device 146 as described above. The computer executable code, when being executed, may perform one of the methods described above. In certain embodiments, the non-transitory computer readable medium may include, but not limited to, the storage device 146 of the computing device 140 as described above, or any other storage media of the computing device 140.

In summary, certain embodiments of the present invention provide a systematic structure and method to automatically enroll a large number of products, and improve the efficiency of a logistic solution for e-commerce companies. A transparent panel is placed between conveyor belts, and RGB cameras and depth cameras are placed above and under the transparent panel. By this type of design, the system is able to capture appearance of all six surfaces of the product without the need of flipping the product. The system also includes scales to measure weight distributions of the product. When the metric center of the product 102 is not the center of weight, the weight distribution information is helpful for instructing the specific manipulation of the product, for example, by a robotic device. This automatic enrollment system, among other things, provides six side surface appearance, 3D model, barcode identification, and weight distribution information, and store those information in a product database. The information can then be used by others, such as a robotic device.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for automatic product enrollment, comprising:
   a belt conveyor system having a first end and a second end, configured to convey a product from the first end to the second end;
   a transparent panel, disposed in a path of the conveyor belt;
   four scales A, B, C and D configured to record weights of the product at different points, wherein the scales A and D are disposed at the first end, the scales B and C are disposed at the second end, and a line connecting the scales A and B is parallel to a line connecting the scales D and C;
   a plurality of first cameras, respectively disposed above the transparent panel, under the transparent panel, and above the scales, and configured to capture visual images of the product;
   a plurality of second cameras, respectively disposed above and under the transparent panel, and configured to capturing depth images of the product;
   a plurality of lights, disposed above and under the transparent panel, and configured to light up the product; and
   a computing device, configured to:
   detect identifications of the product from the captured visual images;
   determine three-dimensional (3D) model with appearance of the product using the captured visual images and depth images;
   calculate weight distribution of the product based on the 3D model with appearance of the product, the captured visual images of the product when the product is located on the scales for recording weights, and the recorded weights of the product;
   determine manipulation parameters of the product based on the dimensions, the orientations, and the weight distribution of the product;
   retrieve warehouse information of the product from a warehouse management system, based on the identification; and
   enroll the warehouse information, the 3D model with appearance, the weight distribution, and the manipulation parameters of the product in a product database,
   wherein the manipulation parameters comprise grasping surface of the product and grasping point on the grasping surface,
   wherein the weight distribution of the product is calculated as a relative location of a center of mass to a geometrical center computed from a geometrical shape of the product, and the center of mass is calculated by:
   obtaining weights Fa, Fb, Fc and Fd measured by the scales A, B, C and D, respectively;
   summing the weights Fa, Fb, Fc and Fd as Fabcd, summing the weights Fb and Fc as Fbc, and summing the weights Fc and Fd as Fcd;
   calculating a distance L between the first end and the second end, and a distance W between the line connecting the scales A and B and the line connecting the scales D and C;
   calculating a projected center of mass M of the product projected on the belt conveyor, wherein the projected center of mass M is in a distance of L×Fbc/Fabcd to the first end and in a distance of W×Fcd/Fabcd to the line connecting the scales A and B; and
   calculating the center of mass by extending the projected center of mass M upward half of a height H of the product.

2. The system of claim 1, wherein the computing device is further configured to: send the enrolled information of the product from the product database to the warehouse management system.

3. The system of claim 2, wherein the identification of the product comprises a tag, an Apriltag, a quick response (QR) code, an one-dimensional (1D) or two-dimensional (2D) barcode, a watermark, or the 3D model with appearance.

4. The system of claim 1, wherein the computing device is further configured to store one or more captured visual images in the product database.

5. The system of claim 1, further comprises an opaque housing enclosing the conveyor belt, the transparent panel, the scales, the plurality of first cameras, the plurality of second cameras, the lights, and the computing device.

6. The system of claim 1, further comprising a rig disposed around the conveyor belts, wherein the plurality of first cameras, the plurality of second cameras, and the lights are mounted on the rig.

7. The system of claim 1, wherein the rig comprises an upper layer, a middle layer, and a lower layer, the conveyor belts are located between the middle layer and the lower layer, and the plurality of first cameras, the plurality of second cameras, and the lights are respectively placed on all the three layers of the rig.

8. The system of claim 1, wherein the belt conveyor system comprises a first conveyor belt having the first end and a second conveyor belt having the second end, the transparent panel is placed between the first conveyor belt and the second conveyor belt, a top plate is placed on top of the scales, and top surfaces of the first conveyor belt, the second conveyor belt, and the transparent panel are at a same plane as the top plate.

9. The system of claim 1, wherein the transparent panel has a first corner and a second corner at two ends of a diagonal line of the transparent panel, the depth cameras comprise a first depth camera disposed above the first corner and a second depth camera disposed under the second corner.

\* \* \* \* \*